April 26, 1949.   T. WEBER   2,468,419
FIFTH-WHEEL STRUCTURE

Filed July 9, 1946   3 Sheets-Sheet 1

Inventor:
Tobias Weber,
by: [signature]
Attorney

April 26, 1949. T. WEBER 2,468,419
FIFTH-WHEEL STRUCTURE
Filed July 9, 1946 3 Sheets-Sheet 2

Inventor:
Tobias Weber
by: [signature]
Attorney

April 26, 1949. T. WEBER 2,468,419
FIFTH-WHEEL STRUCTURE
Filed July 9, 1946 3 Sheets-Sheet 3

Inventor:
Tobias Weber
by: [signature]
Attorney.

Patented Apr. 26, 1949

2,468,419

UNITED STATES PATENT OFFICE 2,468,419

FIFTH WHEEL STRUCTURE

Tobias Weber, Los Angeles, Calif.

Application July 9, 1946, Serial No. 682,429

8 Claims. (Cl. 308—221)

My invention relates to fifth wheel means for use between the front axle and body of a vehicle, the primary object being to eliminate or reduce to a minimum excessive friction and binding tendency between the co-operating parts. The invention is particularly although not exclusively applicable to trailers. In practice a heavily loaded vehicle usually tends to bind and seize the truck chassis thereby retarding or making steering difficult. As a result when operating a trailer on slippery roads and particularly when turning corners the front wheels will not usually respond to steering but tend to continue in a direct line forwardly, thus forcing the rear wheels of the truck to skid. By the use of my improved fifth wheel this objection is reduced to a minimum.

Fifth wheel structures heretofore in use have been subject to excessive wear and frequently require the application of shims between the wear surfaces to take up lost motion. An object of my invention is to provide means by which the parts can be adjusted to take up any wear without using any shims. Another advantage is the production of a fifth wheel which has maximum strength of construction and which can be easily dismantled and reassembled and the assembled parts thereof being interlocked and held together as a self-contained unit in such manner that they are not liable to become separated unintentionally. Among further objects and advantages are simplicity of construction and increased effectiveness in use.

Figure 1:
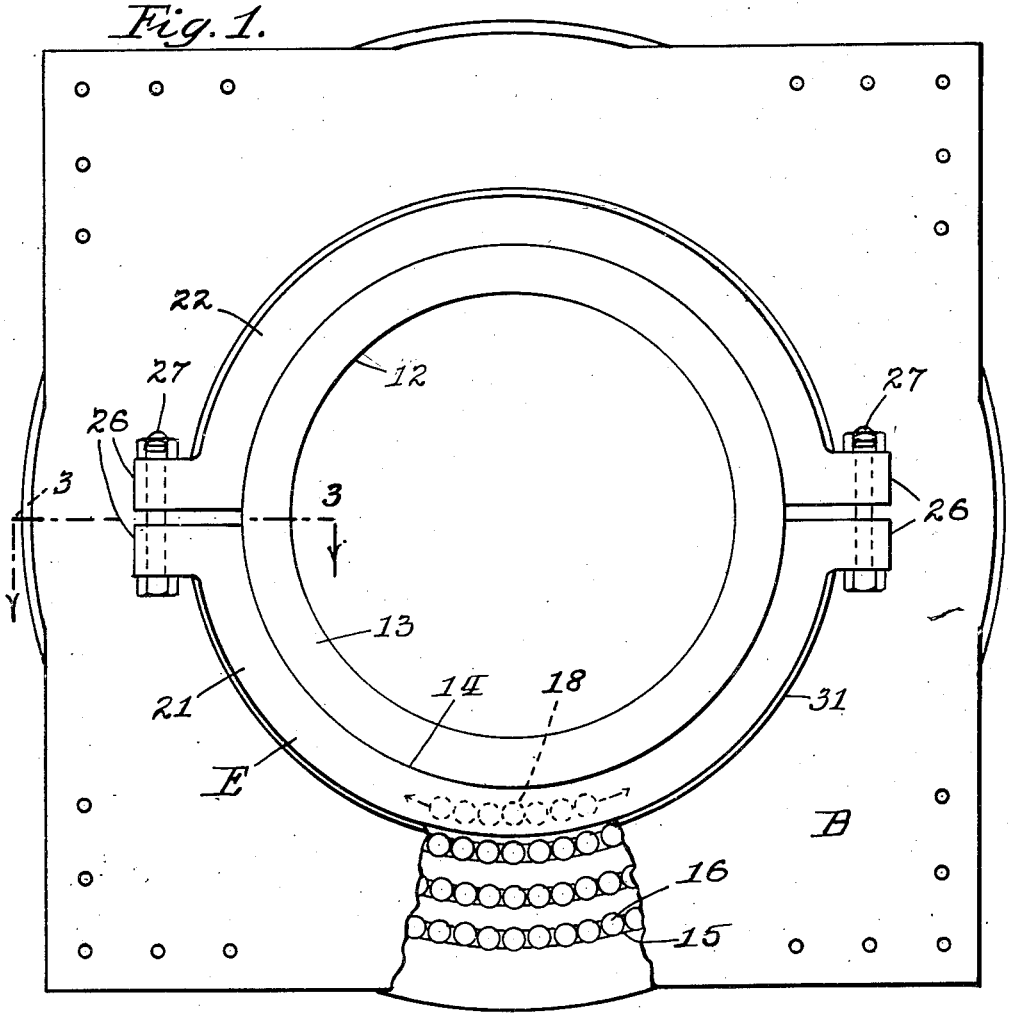
Figure 2:
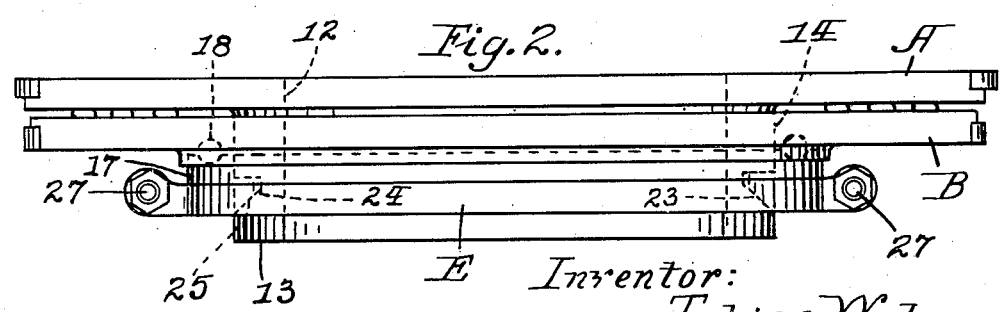
Figure 3:
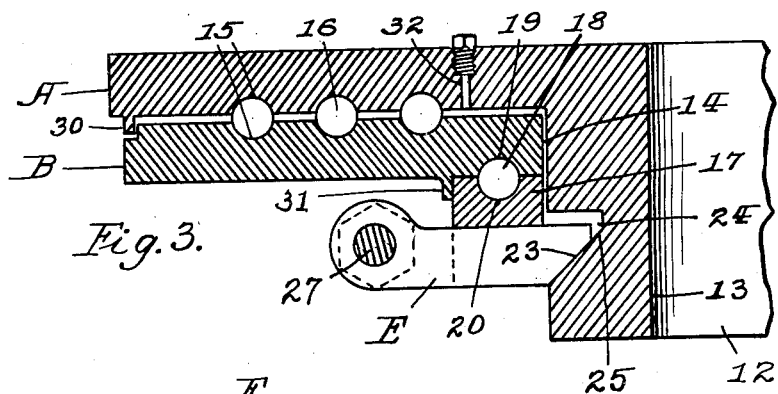
Figures 4, 8:
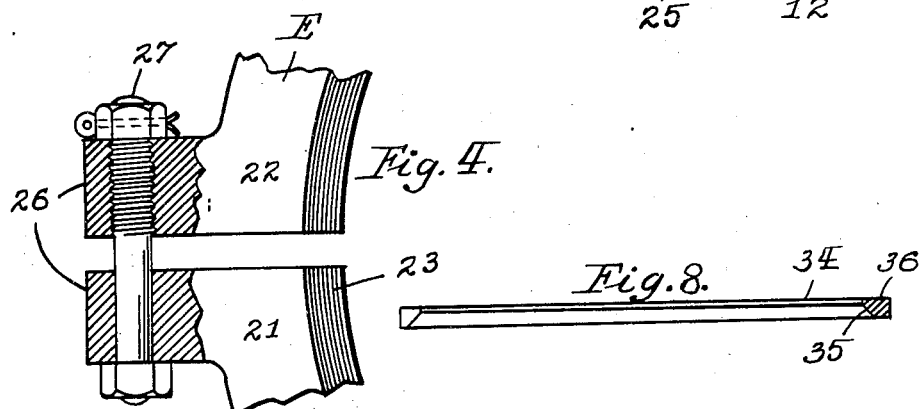
Figure 7:
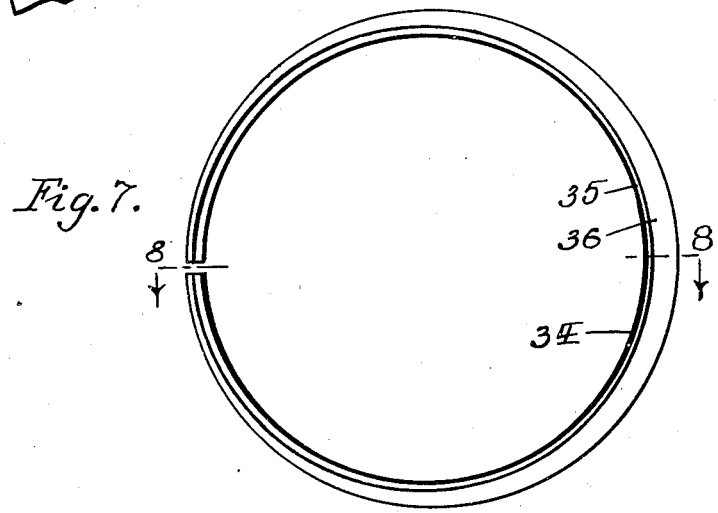
Figure 5:
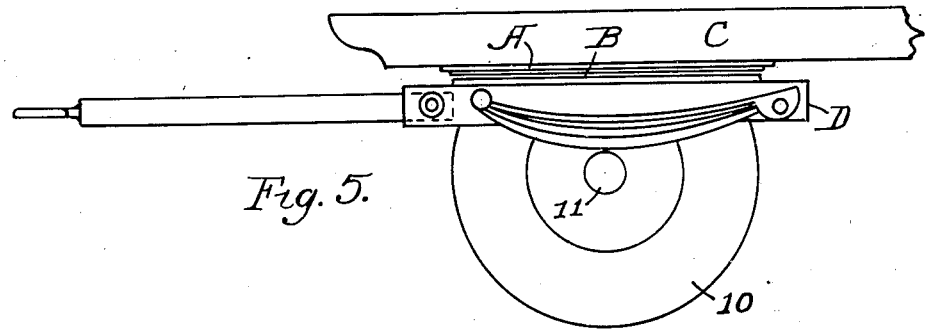
Figure 6:
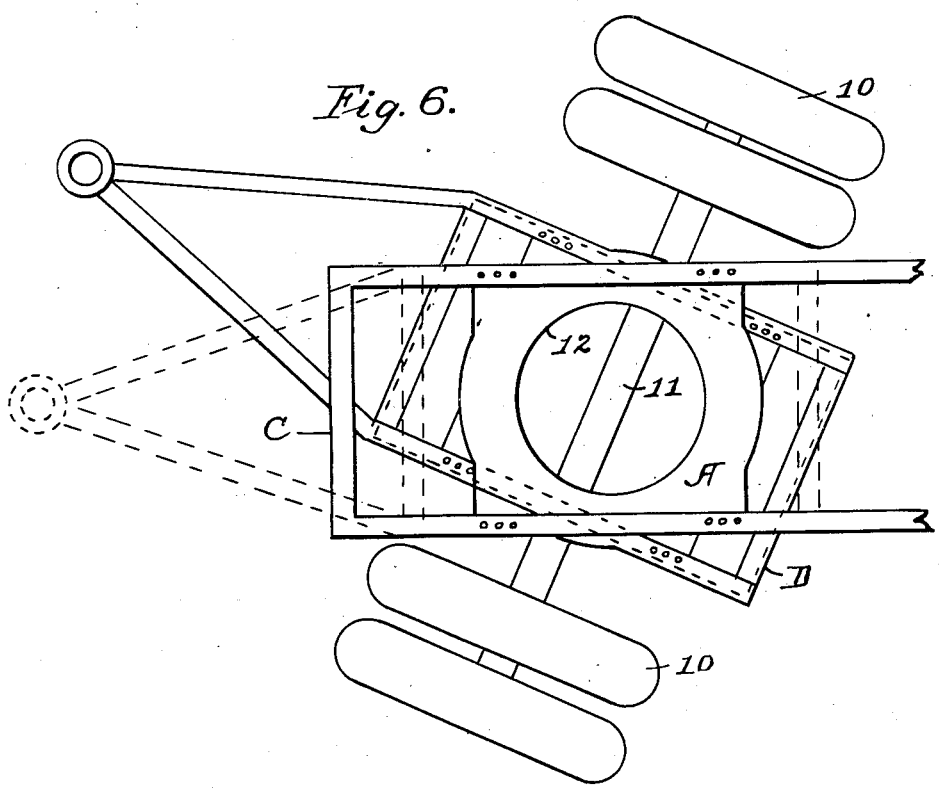

In the accompanying drawings forming part of this specification, Fig. 1 is a bottom plan of my improved fifth wheel self-contained unit, a portion thereof being broken away and showing part of the antifriction bearing elements between the working parts thereof; Fig. 2 is an elevation looking at one edge portion of the structure shown in Fig. 1; Fig. 3 is a typical cross section of a detail on an enlarged scale taken on the line 3—3 of Fig. 1; Fig. 4 is a plan of a detail on an enlarged scale of the split adjusting ring; Fig. 5 is a plan of a detail showing the application of my improved fifth wheel structure in use on a trailer; Fig. 6 is a side elevation of the structure shown in Fig. 5; Fig. 7 is a bottom plan of an alternative construction of the split adjusting lock ring which is employed for taking up wear between the bearing surfaces of the fifth wheel structure, and Fig. 8 is a section taken on the line 8—8 of Fig. 7.

In the drawings, A and B represent two coacting upper and lower fifth wheel bearing plates which respectively are fastened by welding, riveting, bolting or any other suitable means to upper and lower body and truck chassis frames C and D. The body chassis frame as shown is of usual channel type construction in which the upper plate member A of rectangular marginal shape is secured as a gusset to reinforce the strength of the upper chassis frame. The truck or subframe D is of usual channel type construction in which the lower bearing plate B is secured in the above manner, the latter being of rectangular marginal shape and functioning as a gusset to impart strength and reinforce the truck or subframe. The truck or subframe is mounted in the usual manner on the usual supporting wheels 10 which are journaled on the axle 11. The bearing plates A and B function as a vertical journal or swivel support without using a king pivot pin.

The upper bearing plate A is formed with a centrally disposed opening 12, the inner portion of said plate being provided with a downwardly extending cylindrical flange or sleeve 13. The lower bearing plate B has an annular opening 14 of corresponding diameter to receive the flange or sleeve downwardly therethrough. Both bearing plates A and B are freely rotatable, one about the other in a normal horizontal plane. A plurality of concentric pairs of coinciding grooves forming raceways 15 in the adjacent surfaces between the upper and lower bearing plates are provided in which series of antifriction bearing balls 16 are freely retained. In this manner a freely operating swivel support is produced between the upper and lower bearing plates, which latter are secured to the body and truck.

Binding tendency due to any sudden inequalities in a road over which the trailer is driven is equalized by a supplemental antifriction bearing support below the inner portion of the lower bearing plate. This supplemental bearing support comprises a bearing ring 17 closely surrounding the flange or sleeve 13 and a series of antifriction bearing balls 18 which are held and travel freely in the annular raceway grooves 19 and 20 in the lower surface of the lower bearing plate B and the upper surface of the bearing ring 17.

The bearing plates A and B and bearing ring 17 are locked together as a self-contained unit by a split lock ring E which as shown is divided into substantially semicircular segments 21 and 22. The lock ring is formed with an inner annular wall which has a lower inner annular bevel 23 sloping downwardly and outwardly. The flange or collar 13 is provided with an annular channel 24 in the lower portion of its outer cylindrical surface. This channel is formed with an upwardly and inwardly annular beveled shoulder 25 corresponding with the bevel 23 of the lock ring and with which the latter is adapted to engage when the lock ring segments are contracted by tightening and fastening together. The end portions of the lock ring segments are formed with pairs of radiating flanges 26 which are secured together to contract the segments of the ring horizontally into the channel 24 by draw bolts 27. The bearing ring 17 is thus supported vertically by the lock ring. Normally the channel 24 is of increased height above the lock ring to provide clearance space vertically and the ends of the segments are spaced apart so that normally the segments may be contracted and adjusted by tightening the draw bolts 27. In this manner the bearings are adjusted to compensate wear and take up any undesirable looseness. The bevel surfaces between the channel and the lock ring thus function as draw shoulders to adjust the bearings vertically whenever desired and to assist in locking the bearing plates of the fifth wheel structure together as a self-contained unit. This form of adjustment avoids the necessity of using any shims from time to time for taking up or compensating slack caused by wear or other looseness. Heretofore shims have been necessary to take up wear and their application has been laborious and expensive and the cause of much loss of time.

The draw bolts 27 it will be noted are easily accessible from below for making adjustments. They are also made so that when adjusted they will lock and not loosen due to vibration and jolting. The bearing plates A and B may be provided with anti-dust rings 30 and 31 as shown in Fig. 3, which reduce the tendency for dust and grit contacting the ball bearing elements between the bearing plates and between the lower bearing plate B and the bearing ring 17. Also provision is made by the oil hole 32 for applying lubricating medium between the bearing plates.

It is contemplated that various modifications in the construction set forth may be made within the spirit and without departing from the scope of the invention. One such modification is disclosed in Figs. 7 and 8 in which a split spring lock ring 34 having the lower annular draw shoulder 35 is provided. This ring is intended to take the place of the lock ring E and when applied in the annular draw groove 24 is adapted to automatically contact and tighten sufficiently to take up any slack between the antifriction bearings above described. This ring has a thick tapering body portion 36 and is made of proper diameter and of sufficient resilience to function in the above manner. It is contemplated that roller bearings may be substituted for the ball bearings above shown and described, such substitution coming within the scope of ordinary mechanical ability. It is also contemplated that the lock ring E may be made in the form of a single split ring or any number of contractible sections.

I claim:

1. A fifth wheel structure having cooperating bearing plates to be secured to the body frame and subframe of a vehicle having antifriction bearings interposed between said plates and an interlocking connection uniting said plates into a unitary structure, said interlocking connection having an annular groove in a portion of one of said plates and an annular ring seated in said groove and engaging the opposite bearing plate, said groove and ring having bevel engaging surfaces by which the plates may be drawn into close working connection.

2. In a fifth wheel structure having cooperating antifriction bearing elements, one of said elements to be secured to the body frame of a vehicle and the other to the subframe of the vehicle, and an interlocking connection between said bearing elements comprising an annular groove in a portion of one of said bearing elements and a split ring seated in said groove and engaging and holding both of said bearing elements interlocked, said groove and ring having engaging bevel shoulders by which said engagement can be varied to adjust the bearing elements in relation to each other.

3. A fifth wheel having two cooperating antifriction members, one of said members to be secured to the body frame of a vehicle and the other to the subframe of said vehicle, and an interlocking connection between said members comprising an annular groove in said body frame member, a split ring seated in said groove and holding the subframe antifriction member in cooperation with said body frame antifriction member, means for holding said ring in said groove, and means actuated by the tightening of said ring for adjusting slack between the surfaces of said antifriction members.

4. A fifth wheel having two cooperating antifriction bearing members revoluble on a common axis in relation to each other, said members having antifriction members therebetween and being movably disposed to and from each other to compensate any slack therebetween, a split ring and groove interposed between said bearing members to lock said members together, means for contracting and locking said ring in said groove, and means actuated by contracting said ring for adjusting said bearing members into close cooperation with said antifriction members.

5. A fifth wheel having two cooperating antifriction bearing members revoluble on a common axis in relation to each other, said members having freely revoluble antifriction elements therebetween and being movably disposed to and from each other to regulate any slack therebetween, one of said bearing members having an inner depending sleeve extending below the companion bearing member, said sleeve having an annular groove in its outer surface below the companion bearing member, a split ring seated in said groove and holding said bearing members in revoluble cooperation, means for contracting said ring, said ring having means actuated by the contracting movement thereof for compensating any slack between said bearing members.

6. In a device of the class set forth having cooperating antifriction bearing elements, one of said elements to be secured to the body frame of a vehicle and the other to the sub-frame of said vehicle, an interlocking connection between said bearing elements comprising an annular groove in one of said elements, a split ring seated in said groove having draw shoulders on its contiguous split ends, and means cooperating with said draw shoulders to contract and lock said ring in said groove.

7. A fifth wheel structure having two cooperating antifriction bearing members revoluble on a common axis in relation to each other, said members having antifriction members therebetween and being movably disposed to and from each other to compensate any slack therebetween, a split ring and groove interposed between said bearing members to lock said members together, means for contracting and locking said ring in said groove, and means actuated by contracting said ring for adjusting said bearing members into close cooperation with said antifriction members.

8. A fifth wheel structure having two cooperating antifriction bearing members revoluble on a common axis in relation to each other, said members having freely revoluble antifriction elements therebetween and being movably disposed to and from each other to regulate any slack therebetween, one of said bearing members having an inner depending sleeve extending below the companion bearing member, said sleeve having an annular groove in its outer surface below the companion bearing member, a split ring seated in said groove and holding said bearing members in revoluble cooperation, and means for contracting said ring, said ring having means actuated by the contracting movement thereof for compensating any vertical slack between said bearing members.

TOBIAS WEBER.

REFERENCES CITED

The following references are of record in the file of this patent:

UNITED STATES PATENTS

| Number | Name | Date |
| --- | --- | --- |
| 430,648 | Hildreth | June 24, 1890 |
| 610,173 | Edgar | Sept. 6, 1898 |
| 722,036 | Norton | Mar. 3, 1903 |